Patented Aug. 15, 1933

1,922,918

UNITED STATES PATENT OFFICE 1,922,918

PRODUCTION OF LIQUID, IN PARTICULAR AROMATIC, HYDROCARBONS

Fritz Winkler, Hans Haeuber, and Paul Feiler, Ludwigshafen-on-the-Rhine, Germany, assignors to I. G. Farbenindustrie Aktiengesellschaft, Frankfort-on-the-Main, Germany No Drawing. Application April 15, 1931, Serial No. 530,424, and in Germany January 27, 1930

7 Claims. (Cl. 260—168)

The present invention relates to improvements in the production of liquid, in particular aromatic, hydrocarbons.

This application is a continuation-in-part of our copending application Ser. No. 509,538, filed January 17th, 1931.

We have found that liquid, and in particular aromatic, hydrocarbons are obtained in a particularly advantageous manner by the thermal treatment in the presence of a catalyst comprising free elementary silicon of methane or gaseous hydrocarbons comprising methane and especially hydrocarbon gases comprising more than 80% of methane.

The said methane or gas rich in methane may be from any source, as for example, from the reduction of oxides of carbon with hydrogen or obtained by partial liquefaction and fractionation of coke oven gas or coal gas. Natural gas or the methane fraction thereof may also be employed as initial materials.

The favorable effect of working in this manner consists not only in the fact that the silicon promotes the production of liquid hydrocarbons to a large extent but that even after working for long periods of time no carbon is deposited on the catalyst as is the case with many of the catalysts hitherto proposed for this purpose and as would be expected at the high temperatures necessary for the said conversion.

The temperatures preferably employed range above about 700° and do not usually exceed 1200° C. When treating methane or gases containing methane temperatures of between 960° and 1200° C. are preferably employed and particularly high yields are attained at a mean temperature between about 1040° and 1080° C.

The free elementary silicon may be employed in various forms, as for example pieces obtained by fusion processes or bricks moulded from silicon powder, if desired, with an addition of a binding agent such as clay, alumina, water glass or other silicates. The silicon of commerce may also be employed for the production of the catalyst. The catalyst will usually contain more than 90 per cent of free elementary silicon. It may also be employed deposited on carriers, such as burnt fire clay, silica gel and the like.

In many cases it is advantageous to supply the necessary amount of heat to the process by heating the charge of silicon by means of an electric current, in which case the silicon may act as an electrical resistance. In this manner the thermal process takes place substantially on the catalyst itself and the walls of the reaction chamber are protected.

In addition to the large amounts of liquid hydrocarbons, such as hexylenes, heptylenes, benzene, toluene and the like which are obtained as the main products at the said high temperatures, gaseous hydrocarbons, in particular the olefines ethylene, propylene, butylene and the like are obtained at the same time.

The process is usually carried out under atmospheric pressure. where practicable an apparatus is available tight against atmospheric pressure, decreased pressure may be employed. This is favorable, as regards the course of the reaction, but not always desirable from an economic standpoint, since a large apparatus is required to attain a given throughput. In many cases it is advantageous and economical to carry out the process under increased pressure, rising to about 200 atmospheres since a greater throughput per unit of reaction space is thus attained. Extraneous gases, such as hydrogen or nitrogen may be added to the aforesaid gases or may be present in the initial gas mixture employed. Too great a dilution will, however, give rise to a decrease in the yield of liquid hydrocarbons, and the smaller the content of methane in the gases the higher is the temperature required.

The following example will further illustrate how the invention may be carried out in practice, but the invention is not restricted to this example.

Example 7 cubic metres of a gas consisting to the extent of 85 per cent of methane, and the remainder of nitrogen and hydrogen are passed in the course of 10 minutes through a reaction vessel 5.5 metres high, and 0.25 metre in internal diameter the walls of which are lined with bricks of burnt fire clay. The said vessel is filled with 270 kilograms of lumps of a silicon catalyst prepared by melting metallic silicon. The said vessel was prior to the reaction heated up to a temperature of about 1100° C. by passing hot combustion gases therethrough. In a single passage 280 grams of a condensate boiling to the extent of 60 per cent up to 200° C. and consisting for the most part of benzene are obtained. The residual gas contains 61 per cent of methane, and may be recycled, if desired after being mixed with fresh gas or may be treated in a second reaction vessel. The said process may be carried out periodically by an intercalation of heating and reaction periods.

By heating externally the process may be carried out in a continuous manner. Particularly in this case the surface of the walls of the apparatus should be small compared with the surface of the catalyst.

In the foregoing example, the separation of the liquid reaction products from the gases may be effected under the prevailing pressure and the gases may be directly led to a second reaction tube or returned to the first.

The pressure is not restricted to the said value, but may be kept higher or lower. The optimum temperature is dependent on the working pressure.

The resulting hydrocarbons may be employed as motor fuels, as solvents and especially as initial materials for the manufacture of viscous oils.

What we claim is:—

1. A process for the production of a liquid hydrocarbon, which comprises thermally treating a gas comprising essentially methane at a temperature between 700° and 1200° C. in the presence of a catalyst comprising essentially metallic silicon.

2. A process for the production of a liquid hydrocarbon, which comprises thermally treating a gas comprising at least 80 per cent of methane at a temperature between 700° and 1200° C. in the presence of a catalyst comprising essentially metallic silicon.

3. A process for the production of a liquid hydrocarbon, which comprises thermally treating a gas comprising essentially methane at a temperature between 700° and 1200° C. in the presence of a catalyst comprising at least 90 per cent of metallic silicon.

4. A process for the production of a liquid hydrocarbon, which comprises thermally treating methane at a temperature between 700° and 1200° C. in the presence of a catalyst comprising essentially metallic silicon.

5. A process for the production of a liquid hydrocarbon, which comprises thermally treating at a temperature of between 960° and 1200° C. a gas comprising essentially methane in the presence of a catalyst comprising essentially metallic silicon.

6. A process for the production of a liquid hydrocarbon, which comprises thermally treating at a temperature of between 1040° and 1080° C. a gas comprising essentially methane in the presence of a catalyst comprising essentially metallic silicon.

7. A process for the production of a liquid hydrocarbon, which comprises heating lumps of silicon up to a temperature of about 1100° C. by passing combustion gases thereover, and thereupon passing a gas comprising essentially methane over the catalyst thus heated.

FRITZ WINKLER.
HANS HAEUBER.
PAUL FEILER.